United States Patent [19]

Whittenberger

[11] Patent Number: 4,793,136

[45] Date of Patent: Dec. 27, 1988

[54] REINFORCED METALLIC HONEYCOMB STRUCTURE

[75] Inventor: William A. Whittenberger, Garrettsville, Ohio

[73] Assignee: W. R. Grace & Co., New York, N.Y.

[21] Appl. No.: 89,577

[22] Filed: Aug. 26, 1987

[51] Int. Cl.⁴ .............................................. F01N 3/28
[52] U.S. Cl. ............................... 60/299; 422/177; 422/180; 422/211; 422/222; 502/527
[58] Field of Search ............... 60/299; 422/177, 180, 422/211, 222; 138/37, 38, 39, 40, DIG. 9; 502/527

[56] References Cited

U.S. PATENT DOCUMENTS

| 4,220,625 | 9/1980 | Toh | 422/180 |
| 4,280,926 | 7/1981 | Abe | 422/180 |
| 4,348,360 | 9/1982 | Chang | 422/180 |
| 4,382,323 | 5/1983 | Chapman | 422/180 |
| 4,576,800 | 3/1986 | Retallick | 422/180 |

FOREIGN PATENT DOCUMENTS

| 75657 | 6/1977 | Japan | 422/180 |
| 146216 | 11/1980 | Japan | 422/180 |

*Primary Examiner*—Douglas Hart
*Attorney, Agent, or Firm*—Steven T. Trinker

[57] ABSTRACT

There is provided a fluid conduit comprising a housing, at least a pair of accordion folded corrugated thin metal elements disposed in the housing, and at least one longitudinally extending metal strut for reinforcing the core members against twisting and consequent axial displacement.

9 Claims, 2 Drawing Sheets

REINFORCED METALLIC HONEYCOMB STRUCTURE

This invention relates, as indicated, to a metallic honeycomb structure, particularly useful in automotive exhaust lines, which has been reinforced against displacement of the honeycomb by reason of high frequency vibration and axial forces.

BACKGROUND OF THE INVENTION AND PRIOR ART

Catalytic converters for use with internal combustion engines have for many years been made of ceramic honeycomb inserts within a steel housing and inserted in the exhaust line. These converters have a catalytic material carried within the ceramic honeycomb chambers for converting pollutant materials such as carbon monoxide, ozone, nitrogen oxides, unburned hydrocarbons, etc., to harmless gases, e.g., carbon dioxide, nitrogen, water, etc. Ceramic converter elements have a number of problems including cost, manufacture at a point remote from the point of assembly, and fragility.

Recently, developments have been made in such catalytic converters whereby the ceramic element has been replaced with a corrugated thin metal, accordion folded element having a baked on or in situ formed coating of aluminum oxide onto which catalytic materials, such as platinum, palladium, rhodium, etc., may be deposited. These devices may be manufactured at a single site, lack fragility and are relatively inexpensive. Reference may be had to my copending application Ser. No. 830,698 filed Feb. 18, 1986, which discloses a process for making such nonnesting corrugated thin metal element containing catalystic converters.

In the fabrication of these devices, while various cross-sectional configurations can be made, a convenient configuration is one which is circular. Such circular devices are generally formed from a herringbone corrugated thin metal strip which is folded in a zig-zag manner, or accordion folded back and forth upon itself, with each fold gradually increasing in length up to the diameter desired, and then gradually decreasing in length to the shortest chord acceptable in the steel housing. The herringbone or chevron pattern of the corrugations prevents nesting of the overfolded folds and maximizes the open area through the core element.

These structures, when inserted in an internal combustion engine exhaust line are submitted to cyclic vibrations due to the normal pulsing of the engine, and to a large axial force as well as high temperatures. Automotive manufacturers, for example, have adopted what is known as a "Shake and Bake Test" in accordance with which the device is submitted to an axial force of 60 g's, a temperature of 1560° F., and vibrated at a frequency of 155 Hertz with engine exhaust flowing. Normally, these devices will fail in a few hours, e.g., 26 hours. The standard which must be met is at least 100 hours for certain applications. On occasion 10 hours is satisfactory. Failure in corrugated metal core devices is evidenced by a shifting of the corrugated folds in such a manner that they nest, and thus effect a change in diameter. Under the axial forces applied, portions of the element actually move in an axial direction with respect to the housing, and the device fails.

It has now been found that by inserting "struts" at one or more intervals between folds and extending axially for the length of the element, such struts being otherwise disconnected from the overfolded or layered portions, the devices will meet the standards determined for the "Shake and Bake Test".

BRIEF STATEMENT OF THE INVENTION

Briefly stated, the present invention is in a fluid conduit, especially adapted for insertion in an exhaust line from an internal combustion engines, which conduit comprises (a) a housing, (b) at least a pair of corrugated thin metal elements disposed in and essentially filling said housing, as a honeycomb, and (c) at least one longitudinal extending metal strut dividing said housing into segments. Means are provided for engaging the ends of said corrugated thin metal elements and said strut or struts and retaining said elements and strut or struts against longitudinal movement. Each of said corrugated elements fills a segment of the cross section of said housing with a gas permeable honeycomb with an open area of about 80 to 90% and each of said elements comprises a plurality of accordion folded, nonnesting corrugated thin metal portions and defining longitudinally extending fold lines adapted to conform to the internal geometric configuration of the housing and to lie along the sides of the housing in the portion or segment of the housing filled thereby. The metal strut lies between a pair of said corrugated metal portions or folds. The assembly of the accordion folded corrugated thin metal portions and intermediate struct or struts fills the entire cross section of the housing.

In more specific embodiments of the invention, the corrugated thin metal portions or folds are provided with a coating which includes aluminum oxide. The aluminum oxide may have distributed thereon a catalyst for chemically and/or physically converting pollutant materials to environmentally acceptable materials. In preferred embodiments of the invention, the housing is formed of stainless steel. The corrugated thin metal is also stainless steel and is corrugated in a herringbone or chevron pattern.

BRIEF DESCRIPTION OF THE DRAWINGS

The invention may be better understood by having reference to the annexed drawings wherein.

DETAILED DECRIPTION OF THE INVENTION

Figure 2:
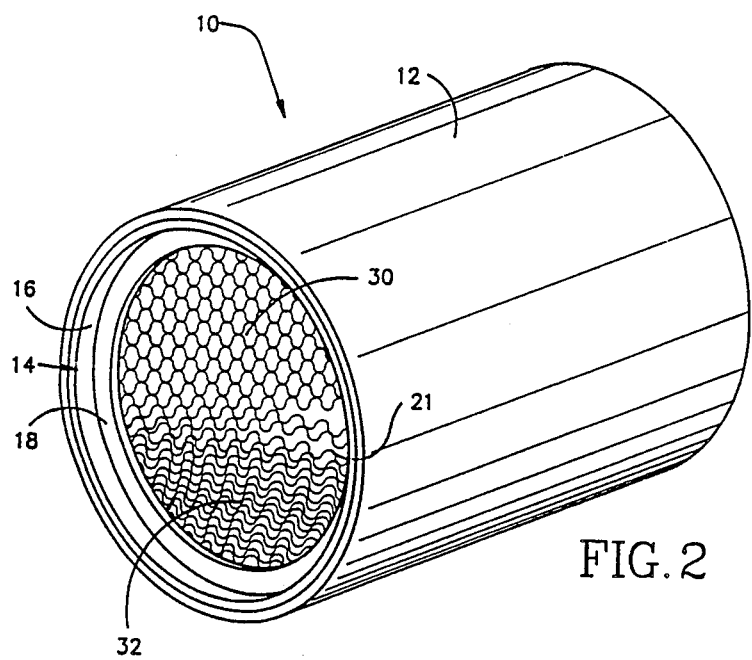
FIG. 2 is an illustration showing what happens when a structure similar to that shown in FIG. 1 is prepared but omitting the reinforcing struts and submited to the "Shake and Bake" test.

As indicated above, the present invention is in a reinforced metallic honeycomb structure adapted to serve as a conduit for a fluid such as an exhaust gas. As indicated above, devices of this type are submitted to extreme vibration due to the pulsing of an internal combustion engine, having axial forces, and very high tempertures. These conditions lead the automotive companies to develop an accelerated endurance test known as the "Shake and Bake Test". A normal catalytic converter element must withstand from 10 to about 100 hours (depending on ultimate use) at 155 Hertz, 60 g's, 850° C. (1562° F.) with engine exhaust flowing through the device. A structure such as shown in FIG. 2 without reinforcing struts in place will fail the "Shake and Bake Test" in about 3 hours.

Figure 1:
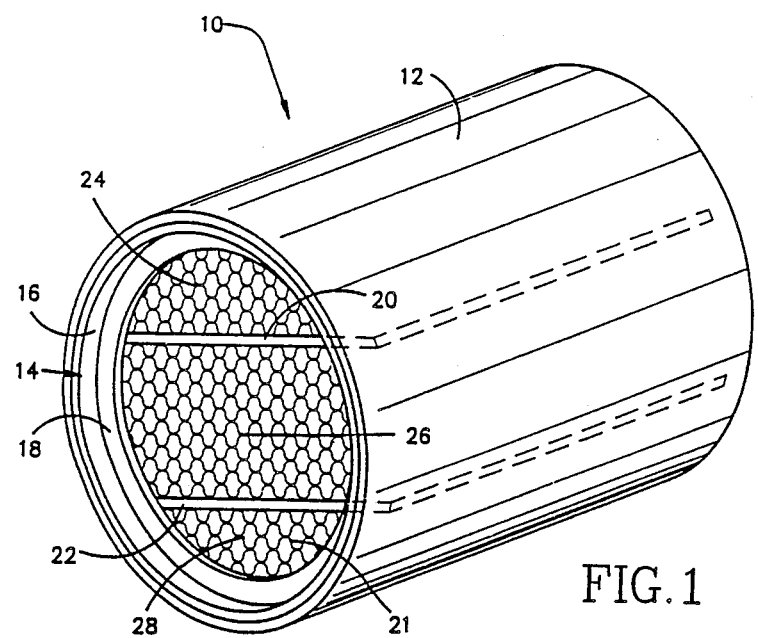
FIG. 1 is a perspective view showing a cylindrical housing containing a corrugated metal honeycomb filler composed of folds or portions of corrugated thin metal folded in an accordion or zig-zag manner. Also shown are the reinforcing struts of the present invention.

Referring now more particularly to FIG. 1, there is here shown a perspective view of a fluid conduit 10. The fluid conduit is composed of a tubular housing 12 having a circular cross section. The opposite ends of the housing are identical. The near end shown in FIG. 1 is provided with a retaining ring 14 having an L-shaped cross section. The upstanding leg 16 is dimensioned to abut and be affixed as by welding, to the inside of the housing 12. The orthogonally related leg 18 is adapted to extend radially inwardly from the inner surface of the housing. The radially inwardly extending leg 18 acts as an abutment for the accordion folded herringbone corrugated thin metal portions, such as portion 21. In the illustration shown in FIG. 1, a plurality of the corrugated thin metal portions 21 are layered one on top of the next and fill a segment 24 of the housing 12. Each of the corrugated metal portions 21 extends along a chord of the circular cross section. As indicated above, the segment 24 is formed of a plurality of such corrugated metal portions 21 accordion folded, or zig-zag folded back and forth, each portion having a different chord length with the fold lines at the ends of the successive folds or chord lengths, contacting the inner surface of the housing 12 for the entire axial length of the segment 24.

In like manner, a central segment 26 formed of folded corrugated thin metal portions 21 extending from side to side of the housing 12, and gradually increasing in chord length to a length approximately equivalent to the diameter of the circular tube 12, and then decreasing in chord length.

Finally, the segment 28 is also formed of a plurality of portions 21 as accordion folded members defining the segment 28.

The reinforcing elements of the present invention which are denominated "struts" are struts 20 and 22. The strut 20, for example, is a stainless steel plate about 1/16th of inch thick extending along a chord of the circular cross section and axially the full length between the radially inwardly directed portions 18 of the end rings or retaining rings 14. The strut 20, for example, may be inserted between adjacent portions 21 defining the over folded member, or the segment 24 may be severed from the segment 26 along a fold line, and the segment 26 severed along a fold line from the segment 28 so that the struts 20 and 22 may be accepted therebetween.

As shown in FIG. 1, there are two struts. The device shown in FIG. 1 as a specific example had an external diameter of 4 inches, an axial length of 6 inches, and the struts were horizontally disposed (as shown in FIG. 1) at intervals of ⅓ the length of the vertical diameter. The L-shaped retaining ring 14 in the specific embodiment had a recessed leg portion 16, 3/16th of an inch in length, and the radially inwardly directed portion 18 extended inwardly a distance of 3/16th of an inch. The extremities of the struts 20 and 22 abutted against the radially inwardly extending leg portion 18 of the retaining ring 14 at each end of the housing 12. The struts 20 and 22 were rectangular in shape.

The device shown in FIG. 2 is identical in all respects to the device shown in FIG. 1 with the exception that the struts 20 and 22 have been omitted. The device shown in FIG. 2 when submitted to the "Shake and Bake Test" failed after 3 hours. The failure was evidenced by a curving of the portions 21 which caused the confronting portions 21 to nest, and the diameter of the element within the housing to decrease thereby making the core portion 32 weak ultimately resulting in axial movement of the portions 21. This was unacceptable. The device shown in FIG. 1, on the contrary, was able to withstand the test conditions and exceed 6 hours. The failure mechanism was at the end rings 14 where the struts bent the ring 14 outwardly and permitted axial shifting of the core. A device such as shown in FIG. 1 is useful in the exhaust line or lines of motorcycle vehicles.

Figure 3:
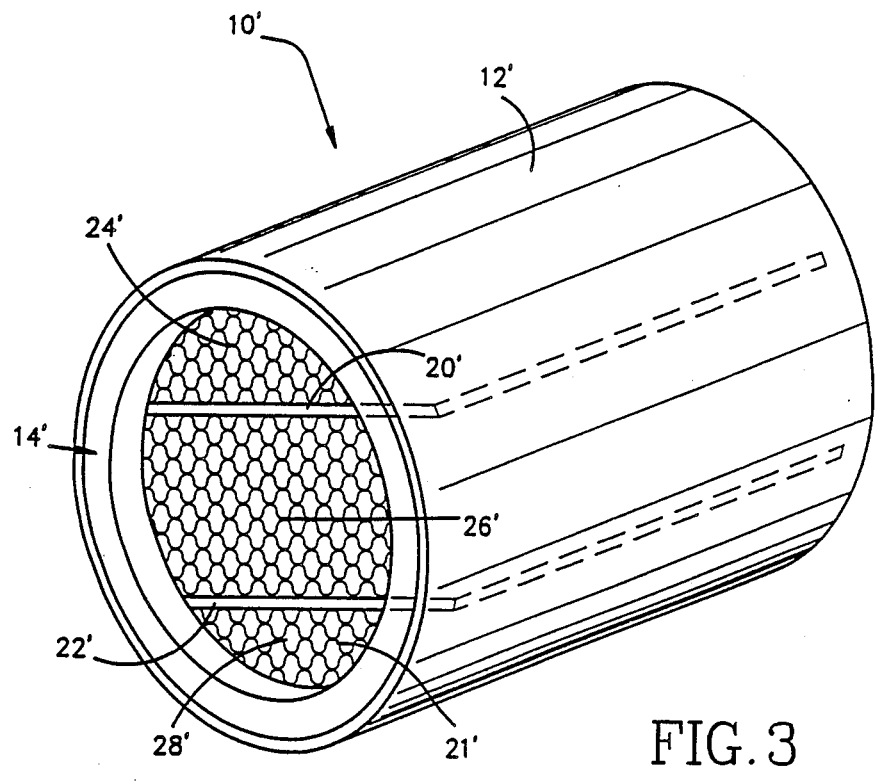
FIG. 3 is a perspective view showing a device similar to that shown in FIG. 1 but having rectangular cross-section retaining rings for better endurance in the "Shake and Bake" test.

FIG. 3 shows another form of the reinforced metallic honeycomb structure in accordance with the present invention which is characterized by an annular retaining ring 14'. This retainer 14' gives better results on the longer time requirements of the "Shake and Bake" test, i.e., up to about 100 hours endurance. The annular ring 14' has a rectangular, e.g., a square cross-section and is welded to the inner surface of the housing 12' at each end. In all other respects, the construction is the same as shown in FIG. 1, except that a prime (') has been associated with each part number. Thus in those applications requiring greater endurance, the structure shown in FIG. 3 is preferred.

As indicated above, the process described in my copending application Ser. No. 830,698 filed Feb. 18, 1986 may be used to produce the accordion folded segments 24, 26 and 28. Also as described in the aforesaid application Ser. No. 830,698, the surface of the corrugated metal may be provided with a wash coat of alumina, the coating baked at an elevated temperature, and a precious metal catalyst deposited on the surface from an aqueous solution followed by baking at an elevated temperature to decompose the catalyst metal-containing compounded deposit the metal element on the alumina surface.

What is claimed is:

1. A fluid conduit comprising (a) a housing, (b) at least a pair of corrugated thin metal elements disposed in said housing, and (c) at least one longitudinally extending metal strut dividing said housing into segments, said housing having at each end thereof retaining means for engaging the ends of said corrugated thin metal elements and said strut, and retaining said elements and strut against against axial movement, each of said corrugated elements filling a segment of the cross-section of said housing and each of said elements comprising a plurality of accordion folded nonnesting corrugated thin metal portions and defining longitudinally extending fold lines adapted to conform to the internal geometric configuration of said housing in the segment of the housing filled thereby and to lie along the sides of said housing, said at least one metal strut lying between a pair of said corrugated metal portions and defining a segment of said housing cross-section filled by one of said corrugated thin metal elements, and opposing longitudinal marginal edges of said strut lying adjacent the sides of said housing, the assembly of accordion folded corrugated thin metal portions and said intermediate strut filling the entire cross-section of the housing to form a honeycomb fluid permeable structure.

2. A fluid conduit in accordance with claim 1 in which the retaining means has an L-shaped cross-section.

3. A fluid conduit in accordance with claim 1 in which the retaining means has a rectangular cross-section.

4. A fluid conduit in accordance with claim 1 in which the retaining means has a square cross-section.

5. A fluid conduit as defined in claim 1 wherein the surfaces of the corrugated thin metal portions are provided with a coating including aluminum oxide.

6. A fluid conduct as defined in claim 5 wherein the coating also includes a catalyst for chemically and/or physically converting pollutant materials to environmentally acceptable materials.

7. A fluid conduit in accordance with claim 1 in which the housing is formed of stainless steel.

8. A fluid conduit in accordance with claim 1 in which the corrugated thin metal is corrugated thin stainless steel.

9. A fluid conduit in accordance with claim 1 in which the housing is of circular cross-section.

* * * * *